US010334711B2

(12) United States Patent
Chawda

(10) Patent No.: US 10,334,711 B2
(45) Date of Patent: Jun. 25, 2019

(54) AIRFIELD RUNWAY LAMP CONTROLLER

(71) Applicant: HONEYWELL INTERNATIONAL INC., Morris Plains, NJ (US)

(72) Inventor: Nipun Kumar Chawda, Bangalore (IN)

(73) Assignee: Honeywell International Inc., Morris Plains, NJ (US)

(*) Notice: Subject to any disclaimer, the term of this patent is extended or adjusted under 35 U.S.C. 154(b) by 0 days.

(21) Appl. No.: 15/648,840

(22) Filed: Jul. 13, 2017

(65) Prior Publication Data
US 2017/0311427 A1 Oct. 26, 2017

Related U.S. Application Data

(63) Continuation of application No. PCT/US2015/016775, filed on Feb. 20, 2015.

(51) Int. Cl.
H05B 33/08 (2006.01)
H05B 41/28 (2006.01)
H05B 37/03 (2006.01)
B64F 1/18 (2006.01)
H05B 39/00 (2006.01)

(52) U.S. Cl.
CPC ............ H05B 37/036 (2013.01); B64F 1/18 (2013.01); H05B 33/089 (2013.01); H05B 33/0887 (2013.01); H05B 39/00 (2013.01)

(58) Field of Classification Search
CPC ........ B60Q 11/00; B60Q 11/005; B60Q 1/38; B64F 1/18; H05B 41/2851; H05B 33/0893; H05B 41/2855; H05B 41/2925; H05B 41/2921; Y02B 20/208
See application file for complete search history.

(56) References Cited

U.S. PATENT DOCUMENTS

| 5,926,115 A | 7/1999 | Schleder et al. |
| 2005/0030192 A1 | 2/2005 | Weaver et al. |
| 2006/0202864 A1* | 9/2006 | Pirschel .................... B64F 1/18 340/945 |
| 2008/0129218 A1* | 6/2008 | Shinmen .............. H05B 41/245 315/280 |
| 2011/0031896 A1 | 2/2011 | Vandevoorde et al. |
| 2011/0285320 A1 | 11/2011 | Kustra |
| 2012/0104972 A1 | 5/2012 | Taubert |
| 2012/0268036 A1 | 10/2012 | Dubrowsky |

(Continued)

FOREIGN PATENT DOCUMENTS

WO 2005038476 A1 4/2005

OTHER PUBLICATIONS

International Search Report and Written Opinion from priority application No. PCT/US2015/016755 dated Nov. 30, 2015 (11 pp.).

(Continued)

Primary Examiner — Dedei K Hammond
(74) Attorney, Agent, or Firm — Brooks, Cameron & Huebsch, PLLC

(57) ABSTRACT

An airfield runway lamp controller is described herein. One airfield runway lamp controller includes a current sense transformer configured to detect a failure of a light source of an airfield runway lamp, and an alternating current (AC) switch configured to shunt the light source of the airfield runway lamp upon the current sense transformer detecting a failure of the light source.

18 Claims, 3 Drawing Sheets

(56) References Cited

U.S. PATENT DOCUMENTS

2014/0042923 A1    2/2014   Yu
2014/0246987 A1    9/2014   Hua et al.

OTHER PUBLICATIONS

Extended Search Report and Opinion from related European Patent Application No. 15882857, dated Sep. 11, 2018, 7 pages.
Communication Pursuant to Article 94(3) EPC from related European Application No. 15882857, dated Jan. 23, 2019, 5 pages.

* cited by examiner

AIRFIELD RUNWAY LAMP CONTROLLER

PRIORITY INFORMATION

This application claims priority to PCT application No. PCT/US2015/016775, filed Feb. 20, 2015, the entire specification of which is incorporated herein by reference.

TECHNICAL FIELD

The present disclosure relates to airfield runway lamp controllers.

BACKGROUND

Airfield lighting systems are designed to provide visual cues and/or signals for an airfield (e.g., runways, approach areas, and/or taxiways of the airfield) in accordance with International Civil Aviation Organization (ICAO) and/or Federal Aviation Administration (FAA) standards. Current airfield lighting systems typically use halogen, filament, and/or light emitting diode (LED) light sources for airfield runway lamps, and are typically wired in a series configuration. If one lamp fails or shuts down, there is a need to shunt that lamp to prevent an entire string of airfield runway lamps from shutting off, and/or to maintain lamp intensity in the remaining functioning lamps.

Current approaches for shunting an airfield runway lamp include using an electronic switch such as a triode for alternating current (TRIAC) to shunt the lamp. However, using an electronic switch such as a TRIAC to shunt an airfield runway lamp can lead to a large drop in voltage across the TRIAC element, as well as a significant power dissipation. Additionally, when using LED light sources, which may use a very low amount of power, electronic switches such as a TRIAC can lead to current flowing through the airfield runway lamp despite the lamp being shunted, which may be against federal regulatory guidelines.

DETAILED DESCRIPTION

Figure 1:
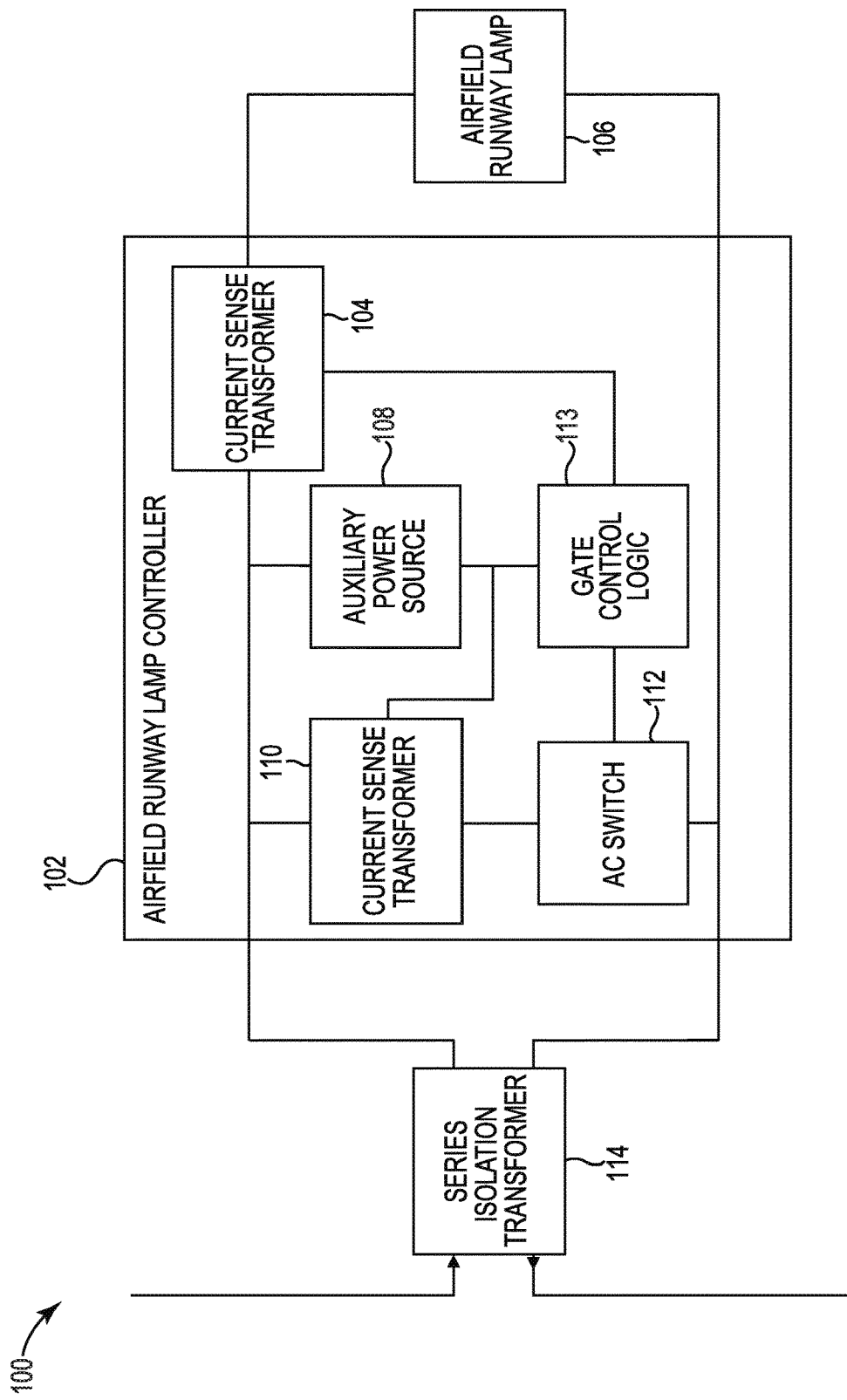
FIG. 1 illustrates a system for controlling airfield ground runway lighting, in accordance with one or more embodiments of the present disclosure.

An airfield runway lamp controller is described herein. For example, one or more embodiments include a current sense transformer configured to detect a failure of a light source of an airfield runway lamp, and an alternating current (AC) switch configured to shunt the light source of the airfield runway lamp upon the current sense transformer detecting a failure of the light source.

Shunting an airfield runway lamp with an AC switch, in accordance with the present disclosure, may lead to a lower voltage drop across the AC switch element of the circuit than the voltage drop across a TRIAC, for example. As a result, when failure of a light source in an airfield runway lamp occurs, the power loss across the AC switch element in accordance with the present disclosure may be lower than previous approaches. Further, shunting an airfield runway lamp with an AC switch in accordance with the present disclosure may ensure there is never a current passing through a faulty airfield runway lamp, in accordance with federal regulatory guidelines.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of airfield runway lamps" can refer to one or more airfield runway lamps. Additionally, the designator "N", as used herein, particularly with respect to reference numerals in the drawings, indicate that a number of the particular feature so designated can be included with a number of embodiments of the present disclosure.

FIG. 1 illustrates a system 100 for controlling airfield ground runway lighting, in accordance with one or more embodiments of the present disclosure. As shown in FIG. 1, the system 100 can include a series isolation transformer 114, an airfield runway lamp controller 102, and an airfield runway lamp 106.

Series isolation transformer 114 can include a transformer capable of isolating high operating voltages for constant current lamps in series circuits. For example, series isolation transformer 114 can include 1:1 ratio current transformers of type FAA L-830/L-831.

Series isolation transformer 114 can be connected to airfield runway lamp controller 102 and airfield runway lamp 106, as illustrated in FIG. 1. Series isolation transformer 114 can be supplied by a constant current regulator to ensure the isolation of low voltage airfield runway lamps from the high operating-voltage series runway circuit, as will be further described herein.

Airfield runway lamp 106 can include, for example, an incandescent (e.g., halogen) or LED light source. That is, lamp 106 can be an incandescent or LED airfield runway lamp, among other types of lamps.

As shown in FIG. 1, airfield runway lamp controller 102 can include a current sense transformer 104 and an alternating current (AC) switch 112. Airfield runway lamp controller 102 can further include an auxiliary power source 108 and current sense transformer 110, as illustrated in FIG. 1.

Current sense transformer 104 can be connected to series isolation transformer 114, airfield runway lamp 106, and AC switch 112 by way of gate control logic 113, and can detect a failure of a light source of airfield runway lamp 106 (e.g., a no lamp load condition). For example, if airfield runway lamp 106 experiences a failure, current sense transformer 104 can detect a no lamp load condition at airfield runway lamp 106.

In addition, current sense transformer 104 can operate to turn on AC switch 112 upon detecting a no lamp load condition of airfield runway lamp 106 by way of gate control logic 113. For example, upon a no lamp load condition, current sense transformer 104 can send a signal to gate control logic 113 located at AC switch 112. As used herein, a gate control logic is a circuit that operates to receive a gate control voltage from an auxiliary power source 108 turn on AC switch 112.

Although gate control logic 113 is shown in FIG. 1 as a component separate from AC switch 112, embodiments of the present disclosure are not so limited. For example, gate control logic 113 can be a component of AC switch 112.

As used herein, a no lamp load condition can include a condition in which the light source of the airfield runway lamp has failed. For example, a no lamp load condition can include a light source (e.g., incandescent light fixture or LED) that is no longer emitting light. As another example, a no lamp load condition can include a light source (e.g., incandescent light fixture or LED) that is emitting light, but not at the required intensity level.

As shown in FIG. 1, airfield runway lamp controller 102 can also include an auxiliary power source 108. Auxiliary power source 108 can be connected to series isolation transformer 114 and AC switch 112 by way of gate control logic 113, as illustrated in FIG. 1. Auxiliary power source 108 can provide a gate control voltage to power AC switch 112 upon current sense transformer 104 detecting a no lamp load condition. As used herein, a gate control voltage is the voltage required for gate control logic 113 to turn on AC switch 112.

As shown in FIG. 1, airfield runway lamp controller 102 can also include current sense transformer 110. As shown in FIG. 1, current sense transformer 110 can be connected to series isolation transformer 114 and AC switch 112. Current sense transformer 110 can direct current to AC switch 112 upon current sense transformer 110 detecting a no lamp load condition.

As shown in FIG. 1, AC switch 112 can be connected to current sense transformer 104 by way of gate control logic 113, current sense transformer 110, and series isolation transformer 114. AC switch 112 can shunt the light source of the airfield runway lamp upon current sense transformer 104 detecting a no lamp load condition of the light source of airfield runway lamp 106. For example, upon a no lamp load condition, current can flow through current sense transformer 110, through AC switch 112, and back to series isolation transformer 114.

AC switch 112 can include two metal-oxide-semiconductor field-effect transistors (MOSFETs). As used herein, MOSFET can refer to a type of transistor used for switching electronic signals. For example, AC switch 112 can comprise n-type or p-type MOSFETs. Although AC switch 112 is described as including two MOSFETs, embodiments of the present disclosure are not so limited. For example, the AC switch can include more than two MOSFETs.

Although not shown in FIG. 1, the two MOSFETs located within AC switch 112 can be connected in series. Advantages of utilizing MOSFETs within AC switch 112 can include a low voltage drop across the AC switch. When AC switch 112 is conducting (e.g., during a no lamp load condition), the voltage drop can be extremely low depending on the particular MOSFET used.

A MOSFET can be selected based on the onset resistance of the MOSFET. A low onset resistance can result in a low voltage drop across AC switch 112 during a no lamp load condition. For example, the voltage drop of AC switch 112 with MOSFETs can be as low as a few millivolts, whereas the voltage drop of a switch comprising a TRIAC element can be around 1.2 volts. Additional benefits can include very low power dissipation during a no lamp load condition. For example, the power dissipation can be less than 1 Watt, whereas the power dissipation of a TRIAC element can be approximately 7 Watts.

Although not shown and/or labelled in FIG. 1 for clarity and so as not to obscure embodiments of the present disclosure, airfield runway lamp 106 can include additional elements such as, for example, a supporting mechanical structure, light housing, and/or optical assembly, among other elements. The optical assembly of airfield runway lamp 106 can distribute the light emitted by the light source into a particular photometric pattern. For example, the optical assembly can distribute the light emitted by the light source into a photometric pattern or patterns compliant with International Civil Aviation Organization (ICAO) and/or Federal Aviation Administration (FAA) standards for airfield runways, approach areas, and/or taxiways.

Figure 2:
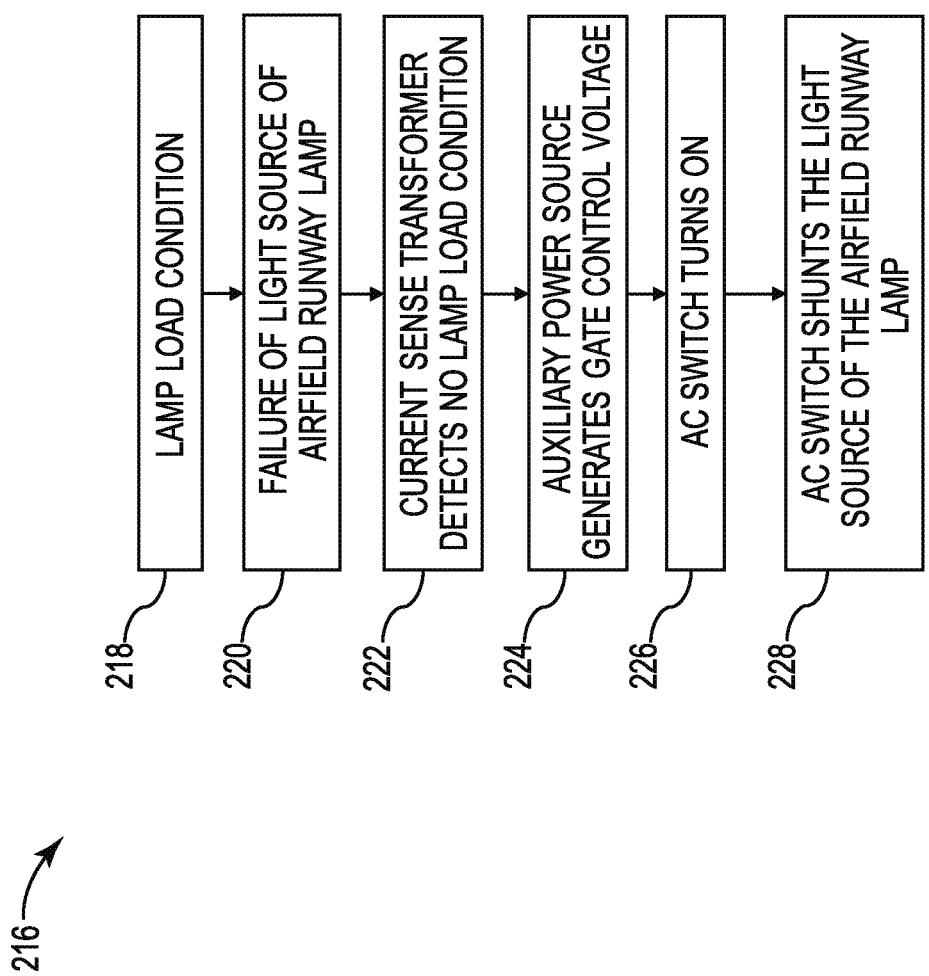
FIG. 2 is a flow chart of a method for controlling an airfield runway lamp, in accordance with one or more embodiments of the present disclosure.

FIG. 2 is a flow chart of a method 216 for controlling an airfield runway lamp, in accordance with one or more embodiments of the present disclosure For example, method 216 can be used by airfield runway lamp controller 102 previously described in connection with FIG. 1 to shunt airfield runway lamp 106 previously described in connection with FIG. 1.

Shunting the airfield runway lamp, as used herein, can include redirecting current around the airfield runway lamp. For example, current can be directed to pass through an AC switch instead of the airfield runway lamp, as will be further described herein.

At block 218 of method 216, the airfield runway lamp is operating at a lamp load condition. As used herein, a lamp load condition can include a condition in which the light source located within the airfield runway lamp is working properly (e.g., the light source is emitting light at the proper intensity). During a lamp load condition, current can flow through a load sense transformer and also through the airfield runway lamp. As a result, no current may flow through a current sense transformer or the AC switch during a lamp load condition.

In this condition, the airfield runway lamp is not shunted by the AC switch. For example, during a lamp load condition, current can flow from the series isolation transformer, through the current sense transformer, through the airfield runway lamp, and back to the series isolation transformer.

At block 220 of method 216, a failure of the light source of the airfield runway lamp occurs. Failure of the light source can include the light source ceasing to emit the required amount of light in the required photometric pattern required for compliance with International Civil Aviation Organization (ICAO) and/or Federal Aviation Administration (FAA) standards for airfield runways, approach areas, and/or taxiways. For example, failure of the light source can include total failure to emit light, or partial failure to emit light.

At block 222 of method 216, the current sense transformer detects the no lamp load condition. A no lamp load condition can include a condition in which the light source of the airfield runway lamp has failed completely, or is not emitting light at the required intensity, as described above.

At block 224 of method 216, the auxiliary power source generates a gate control voltage. The gate control voltage can be generated upon the detection of the no lamp load condition (e.g., upon no current flowing to the current sense transformer). For example, when the current sense transformer detects a no lamp load condition, the auxiliary power source can generate the gate control voltage. The gate control voltage can be the voltage required to power the AC switch.

At block 226 of method 216, the AC switch turns on. For example, the controller can include a gate control logic that can receive the gate control voltage provided by the auxiliary power source, and the AC switch can then be turned on by the gate control logic. For example, the auxiliary power source can generate a gate control voltage upon a no lamp load condition that is received by the gate control logic. The gate control logic, upon receiving the gate control voltage, can turn on the AC switch.

During a no lamp load condition (e.g., while the AC switch is turned on), no current can flow through the current sense transformer. Additionally, no current can flow through the light source on the airfield runway lamp during the no lamp load condition.

At block 228 of method 216, the AC switch shunts the light source of the airfield runway lamp. During the no lamp load condition (e.g., while the AC switch is turned on), current can flow through the current sense transformer. Additionally, current can flow through the AC switch. For example, current can flow from the series isolation transformer, through the additional current sense transformer, through the AC switch, and back to the series isolation transformer during a no lamp load condition. This circuit configuration can provide a method to shunt, by the AC switch of the controller turning on, the light source of the airfield runway lamp.

As described herein, an AC switch in accordance with the present disclosure can be used to shunt the light source of an airfield runway lamp during a no lamp load condition. Utilizing this system, a current sense transformer can be used as a local control for the airfield runway lamp. Using this type of local control of the AC switch can ensure that the current can never flow through the airfield runway lamp in a faulty state (e.g., a no lamp load condition), without relying on external control.

Figure 3:
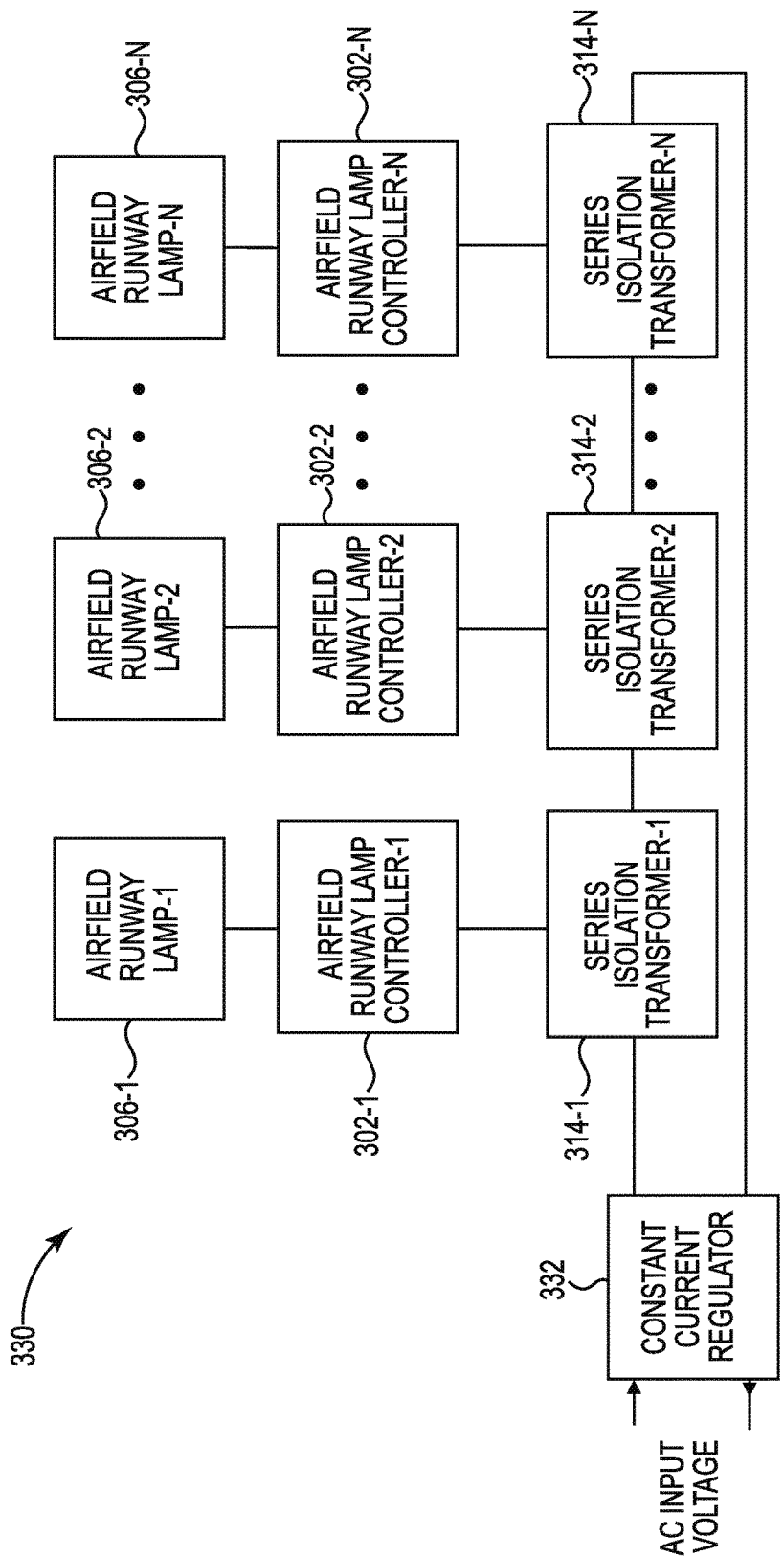
FIG. 3 is a system for controlling airfield ground runway lighting, in accordance with one or more embodiments of the present disclosure.

FIG. 3 is a system 330 for controlling airfield ground runway lighting, in accordance with one or more embodiments of the present disclosure. As shown in FIG. 3, system 330 can include a number of airfield runway lamps 306-1, 306-2, . . . 306-N, wherein each of the number of airfield runway lamps includes a light source. Further, the system 330 can include a number of airfield runway lamp controllers 302-1, 302-2, . . . 302-N, wherein each of the number of airfield runway lamp controllers is configured to shunt the light source of one or more of the number of airfield runway lamps using an AC switch, as previously described herein. Airfield runway lamp controllers 302-1, 302-2, . . . 302-N can be analogous to airfield runway lamp controller 102 previously discussed in connection with FIG. 1, and airfield runway lamps 306-1, 306-2, . . . 306-N can be analogous to airfield runway lamp 106 previously described in connection with FIG. 1. The light source can be shunted upon a failure of the light source (e.g., a no lamp load condition), as previously described herein.

As shown in FIG. 3, system 330 can include a number of series isolation transformers 314-1, 314-2, . . . 314-N connected in series. As a result, the number of airfield runway lamps 306-1, 306-2, . . . 306-N can be connected in series via the number of series isolation transformers, as shown in FIG. 3.

In the embodiment illustrated in FIG. 3, the number of airfield runway lamp controllers can correspond to the number of airfield runway lamps. For example, each airfield runway lamp is controlled by an individual airfield runway lamp controller (e.g., airfield runway lamp 306-1 is controlled by airfield runway lamp controller 302-1).

In some embodiments, the number of airfield runway lamp controllers can be less than the number of airfield runway lamps. For example, one lamp controller can control more than one airfield runway lamp (e.g., one lamp controller can control two airfield runway lamps). However, embodiments of the present disclosure are not so limited.

The number of lamps and controllers in system 330 can vary depending on the size of the airport. For example, a large international airport may have several large runways, as well as a large area for aircraft taxiing and/or approach areas. An airport of this size may use a large number of lamps for lighting these areas; however, a regional airport may not use as many lamps as it can have a smaller area required for lighting.

As shown in FIG. 3, the series isolation transformers are connected in series. In this configuration, current can flow from constant current regulator 332 to series isolation transformer 314-1 and light airfield runway lamp 306-1, series isolation transformer 314-2 and light airfield runway lamp 306-2, etc. Current can then flow back to constant current regulator 332, completing the airfield runway lighting circuit.

In an embodiment consistent with the present disclosure, current from airfield runway lamp 306-1 can shunt airfield runway lamp 306-2 during a no lamp load condition (e.g., airfield runway lamp 306-2 fails) by way of airfield runway lamp controller 302-2. The current can then move on to the next airfield runway lamp that is in a lamp load condition.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor. It is presumed that logic similarly executes instructions for purposes of the embodiments of the present disclosure.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the

What is claimed:

1. An airfield runway lamp controller, comprising:
   a current sense transformer configured to detect a failure of a light source of an airfield runway lamp;
   an alternating current (AC) switch configured to shunt the light source of the airfield runway lamp upon the current sense transformer detecting a failure of the light source; and
   an auxiliary power source configured to provide a gate control voltage to power the AC switch upon the current sense transformer detecting a failure of the light source.

2. The controller of claim 1, wherein the AC switch includes two metal-oxide-semiconductor field-effect transistors (MOSFETs).

3. The controller of claim 2, wherein the two MOSFETs are connected in series.

4. The controller of claim 1, wherein the current sense transformer is configured to turn the AC switch on upon detecting the failure of the light source of the airfield runway lamp.

5. The controller of claim 1, wherein the controller includes an additional current sense transformer configured to direct current to the AC switch upon the current sense transformer detecting the failure of the light source.

6. The controller of claim 1, wherein the controller includes gate control logic configured to receive the gate control voltage provided to the AC switch by the auxiliary power source.

7. A method for controlling an airfield runway lamp, comprising:
   detecting, by a current sense transformer of a controller for an airfield runway lamp, a no lamp load condition upon a failure of a light source of the airfield runway lamp;
   generating, by an auxiliary power source of the controller upon the current sense transformer detecting the no lamp load condition, a gate control voltage to cause an alternating current (AC) switch of the controller to turn on; and
   shunting, by the AC switch of the controller upon turning on, the light source of the airfield runway lamp.

8. The method of claim 7, wherein the gate control voltage is generated when no current is flowing to the current sense transformer.

9. The method of claim 7, wherein the AC switch is turned on by a control logic circuit controlled by the gate control voltage.

10. The method of claim 7, wherein a current flows through an additional current sense transformer while the AC switch is turned on.

11. The method of claim 7, wherein a current flows through the AC switch when the AC switch is turned on.

12. The method of claim 7, wherein no current flows through the current sense transformer during the no lamp load condition.

13. The method of claim 7, wherein no current flows through the light source during the no lamp load condition.

14. A system for controlling airfield ground runway lighting, comprising:
    a number of airfield runway lamps, wherein each of the number of airfield runway lamps includes a light source; and
    a number of airfield runway lamp controllers, wherein each of the number of airfield runway lamp controllers is configured to shunt the light source of one or more of the number of airfield runway lamps upon a failure of that light source using an alternating current (AC) switch;
    wherein each one of the number of airfield runway lamp controllers comprises a current sense transformer, an additional current sense transformer, and an auxiliary power source.

15. The system of claim 14, wherein the system further includes a series isolation transformer.

16. The system of claim 14, wherein the number of airfield runway lamp controllers corresponds to the number of airfield runway lamps.

17. The system of claim 14, wherein the number of airfield runway lamp controllers is less than the number of airfield runway lamps.

18. The system of claim 14, wherein the number of airfield runway lamps are connected in series.

* * * * *